United States Patent [19]

Stewart

[11] 3,749,473

[45] July 31, 1973

[54] LANDING GEAR LEVER KNOB

[76] Inventor: Theodore C. Stewart, 326 Shade Dr., Fairborn, Ohio 45324

[22] Filed: Nov. 4, 1971

[21] Appl. No.: 195,712

[52] U.S. Cl. ............... 350/156, 244/102 R, 240/9.5
[51] Int. Cl. .......................................... G02b 27/28
[58] Field of Search .................... 350/156, 111, 147, 350/157, 243, 321; 16/121, DIG. 30; 244/83 R, 83 A, 102 R

[56] References Cited
UNITED STATES PATENTS

| 3,267,753 | 8/1966 | Harper | 244/102 R |
| 2,819,452 | 1/1958 | Dodd | 350/156 |
| 3,415,589 | 12/1968 | James, Jr. | 350/156 |
| 2,705,318 | 3/1955 | Hallerberg | 240/9.5 |

*Primary Examiner*—David Schonberg
*Assistant Examiner*—Michael J. Tokar
*Attorney*—Harry A. Herbert, Jr. et al.

[57] ABSTRACT

An aircraft landing gear-control handle having a knob member formed from a pair of matching knob-half portions united together into a single knob unit, and constructed from a polarized plastic material that is respectively circularly polarized in clockwise and counterclockwise directions to thereby prohibit the transmittal of ambient light therethrough.

4 Claims, 8 Drawing Figures

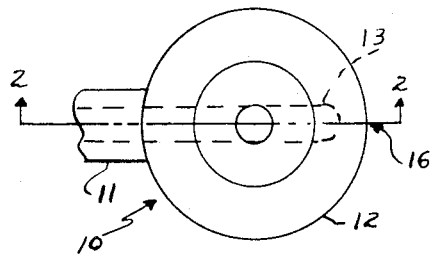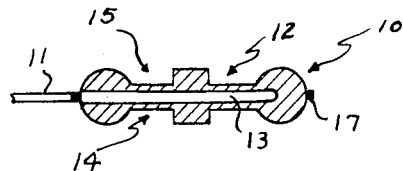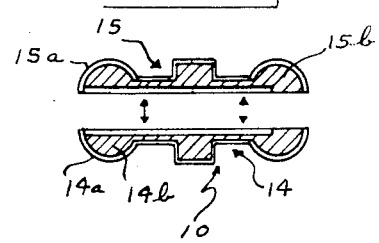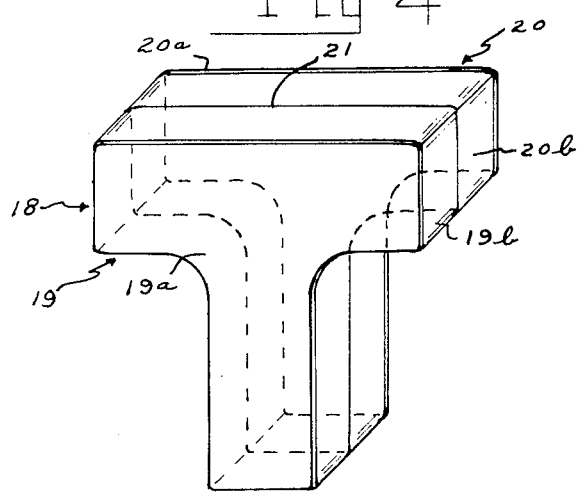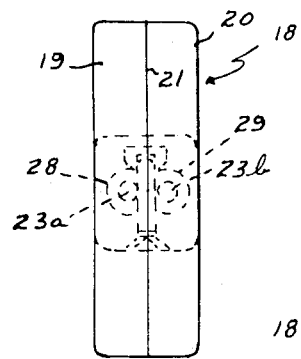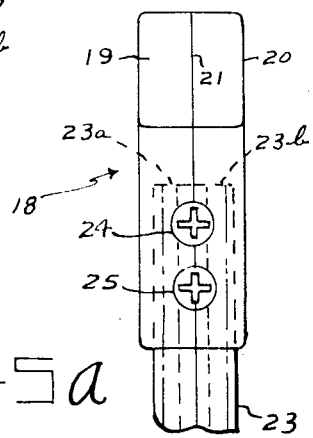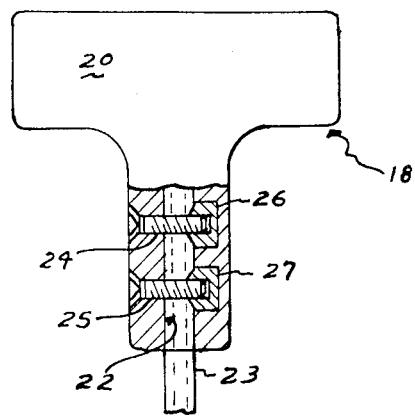
FIRE # 8
PULL 3,749,473

LANDING GEAR LEVER KNOB

BACKGROUND OF THE INVENTION

This invention relates primarily to the field of retractable landing gears for aircraft and, in particular, to the manual control means therefor.

In the retractable landing gear-type of aircraft, a manually operated control handle, consisting principally of a knob and a lever interconnected with, and adapted to operate the landing gear hydraulic system, is conveniently located in the aircraft cockpit for manual actuation generally by the pilot and/or co-pilot. In the standard-type of a control handle, used in many aircraft, an interior light, usually red in color, is located in the control handle-knob member. This red light illuminates the knob member, which then naturally glows red through a transparent portion of the knob member, during the actual operation of the control handle either to raise or lower the landing gear. When operated to either its raised or lowered position, the landing gear is automatically locked in place, at which time the red interior light positioned with the knob member automatically goes out, thus informing the pilot or co-pilot that the landing gear is locked in its correct position. If, however, a malfunction should occur, as when operating the control handle in the correct manner to raise or lower the landing gear and the latter, instead, either remains in its former position or fails to lock in its new position, the red, interior light remains on and thereby acts as a warning signal to the pilot or co-pilot that a malfunction has occurred.

One problem involved in the above-described system occurs during the presence of relatively high ambient light conditions in the aircraft cockpit which tends to obscure and even make pratically invisible the above-referred to landing gear-control handle-knob member and the interior red light thereof. This problem becomes intensified naturally when the high degree of ambient-cockpit light both directly obscures the vision of the pilot and/or copilot and, in addition, strikes and is both reflected by, and transmitted through the knob member. Of course, both the reflected and transmitted light makes it difficult and sometimes even impossible for the pilot and/or copilot to quickly determine the actual position of the landing gear, frequently at a most inopportune and highly dangerous time period during the landing or takeoff of the aircraft. However, the present invention greatly alleviates, if not actually eliminates, this problem in a unique and yet simplified manner as will appear self-evident hereinafter in the following summary and detailed description thereof.

SUMMARY OF THE INVENTION

This invention briefly consists of an improved aircraft landing gear-control handle-knob member that is formed from a matching and united pair of knob segments, each segment being fabricated from a plastic material respectively circularly polarized in clockwise and counterclockwise directions to thereby prohibit or substantially prohibit the transmittal of ambient light therethrough. The outer surfaces of said knob segments are also roughened to make them substantially non-reflective and, in addition, the circumference of the knob member is covered with a thin, outer layer of plane-polarizing material. Thus, the plane-polarizing light from the outer layer is circularly polarized in opposite directions and its further transmittal is, therefore, substantially prevented.

Additional advantages of the invention will become readily apparent from the following disclosure, taken in connection with the accompanying drawings, in which:

BRIEF DESCRIPTION OF THE DRAWINGS

FIG. 1 represents a schematic view, in side-elevation and partly broken-away, illustrating the overall configuration of a standard-type of aircraft landing gear-operating control handle to which the improved knob member portion of the present invention may be applied;

FIG. 2 is a cross-sectional view, taken about on line 2—2 of FIG. 1, showing further details of the inventive control knob member;

FIG. 3 is a second cross-sectional view, somewhat similar to that of FIG. 2, but exploded in form to show still further details of the improved control knob member of the invention;

FIG. 4 is a partly schematic and perspective view, depicting details of a type of aircraft fire extinguisher-control or so-called fire "T" handle to which the improvement of the present invention mapalso be applied;

FIGS. 5, 6 and 7 respectively represent a top, a partly broken-away, front and a side view, illustrating details of an actual design preferred for the fire "T" handle shown in schematic form in FIG. 4; and FIG. 5a is a second top view, as in FIG. 5, depicting the typical markings inscribed on the top of the fire "T" handle, as it appears to the pilot or copilot, for example.

DESCRIPTION OF THE PREFERRED EMBODIMENT

Referring generally to the drawings and, in particular, to FIGS. 1 and 2, a landing gear-manual operating control handle is indicated generally at 10 as including a lever 11 and a knob member 12 that may be uniquely and simply improved in accordance with the novel teachings of the present invention, as will be hereinafter described in detail. The said knob member 12 incorporates an elongated slot, at 13, that may be slidably mounted in snug-fitting relation with an appropriately narrowed-down and projecting, outer end-portion of the lever 11. Suitable screw or other type fasteners (not shown) may be used to effect a positive and rigid interconnection of the outward projecting end of the lever 11 within the knob member-slot 13. The said lever 11 is effective to actuate a hydraulic system (not shown) for operating the aircraft landing gear between its raised and lowered positions.

As seen particularly in FIGS. 2 and 3, the knob member 12 actually may consist of a pair of matching knob portions or segments, each representing one-half of the completed knob unit and indicated respectively and genrally at the reference numerals 14 and 15. Said knob-half portions 14, 15 may, in accordance with the unique configuration of the present invention, each comprise an outer, relatively thin plastic layer or cover sheet, as at 14a and 15a respectively (FIG. 3), and a relatively thick, primary or base-support plastic element at 14b and 15b, respectively. Each plastic sheet, 14a, 15a, may consist of a commercially available polarizing material which, as is well-known, incorporates a certain characteristic polarizing direction that enables the said sheet, 14a, 15a, to transmit only those wave-train components whose electric vectors vibrate parallel to this direction and will absorb those that vibrate at right angles to this direction. The light emerging therefrom will be plane-polarized. The said polarizing direction is, as is also well-known, established during its manufacture by embedding certain long-chain molecules in a flexible plastic sheet and then stretching the sheet so that the molecules are arranged parallel to each other. Obviously, the aforementioned relatively thin, plastic covering sheets 14a and 15a may be oriented with their respective characteristic polarizing directions at any desired angle relative to each other.

The above-referred to relatively thick, primary or base-support elements 14b and 15b of each knob-half portion 14, 15 may be further uniquely constructed of a plastic material that exhibits the characteristic of double refraction, when exposed to the previously noted, plane-polarized light emerging respectively from the relatively thin, polarized plastic covering sheets 14a and 15a. With this double refraction characteristic, which can result, for example, from a particular material such as a so-called quarter wave calcite that is cut so that the optic axis is parallel to its surface, the plane-polarizing light being transmitted by the cover sheet 14a, for example, can be made to fall on the said calcite material comprising the said base-support elements 14b, with the plane of vibration thereof so oriented as to make a 45° angle with the optic axis. The light emerging therefrom would be circularly polarized in the counterclockwise direction or, what is commonly known as right-circularly polarized. On the other hand, if the plane of vibration of the incident (plane-polarized) light should be rotated through an angle of ±90°, as for the cover sheet 15a, the emerging light from the base-support element 15b would be circularly polarized in the opposite, or clockwise, direction known as left-circularly polarized. Naturally, the above-described oppositely oriented, counterclockwise and clockwise circular polarizations of the plastic material comprising the base, supporting knob-half portions 14b, 15b may be, of course, easily provided during the fabrication of the knob member 12 by forming the plastic material of each of the plastic cover sheets 14a and 15a so that the characteristic polarizing direction thereof have been oriented at a 90° difference with each other and relative to the optic axes of each of the polarizing material respectively constituting the primary or base-support plastic elements 14b and 15b corresponding thereto.

With the unique and yet simplified arrangement described hereinbefore, when the aforementioned knob-half portions 14 and 15 have been plastically joined together into the integral unit depicted in FIG. 2, for example, the above-described counterclockwise and clockwise circular polarizations respectively indicated for the knob-half portions 14 and 15 positively provides and ensures that practically no ambient light present in the aircraft cockpit area will be transmitted through, and thus tend to obscure and even make invisible the knob member 12 to the pilot or cipilot at a most critical time during landing or takeoff and particularly when the ambient cockpit light may be unusually bright.

In addition to improving the visibility of the standard-type of aircraft landing gear-control handle-knob member 12 by making the same substantially non-light-transmitting in the unique manner previously described, particularly under high ambient light conditions, the previously mentioned primary or base-support elements 14b and 15b, respectively, of the knob-half portions 14 and 15 may be also made substantially non-reflective in character by roughening the outer circumference of each thereof, as by means of sand blasting. With such roughening of the outer surfaces of the knob-half portions 14 and 15, the knob member 12, which, in its standard form would be transparent, is made, instead, transluscent in character. Also, a light would be mounted in a recess formed in the circumference of the completed knob member 12, as for example in the area thereof indicated generally by the reference numeral 16 in FIG. 1, for the purpose of lighting the interior of the knob member 12 during certain operations of the aircraft landing gear to be hereinafter further described. This light is not shown, since it is already included in the standard landing gear-control handle used in many aircraft today, and therefore the details thereof are unimportant to the present invention. A narrow electroluminescent strip, as indicated schematically at 17 in FIG. 2, may be used, if desired as an optional feature, on the circumference of the knob member 12 for the purpose of achieving better visibility thereof during darkened cockpit conditions.

With the foregoing arrangement, the inventive knob member 12 per se would appear black with, of course, a thin area around the circumference being lighted, if the aforementioned optional electroluminescent strip 17 is used. However, during operation of the landing gear to its raised or retracted position, or lowered position, the interior light in the area indicated at 16 in FIG. 1 would automatically come on in the presently existing standard landing gear-control handle-knob member, as at 12. This interior light, which is red and therefore would illuminate and thus make the knob member 12 of the present invention glow red, remains on until the landing gear completes its selected movement and is locked in either raised or lowered positions, at which time the said light automatically goes out. If, however, a malfunction occurs, as when the pilot or copilot operates the control handle 10 (FIG. 1) in the down position to lower the gear and the latter either remains in its raised position or fails to completely extend and lock in its lowered position, the interior red light in the knob member, as at 12, would remain on, thereby acting as a warning light to the pilot and/or copilot. Of course, with the improved construction of the present invention, whereby the knob member 12 is made both substantially non-light-transmitting and non-reflective in character, in the unique and yet simplified manner hereinbefore described, the usual effect of even the presence of relatively bright, ambient light in the aircraft cockpit on the visibility of the previously noted knob member 12 will have been all but eliminated.

Although the present invention has been described in specific connection with a control handle-knob member, as at 12, for use in operating an aircraft landing gear between raised and lowered positions, it may be also applied to other control means and/or aircraft control systems to be actuated by the pilot, copilot or other aircrew member, such as a fire extinguisher-control handle, indicated generally at 18 in the schematic FIG. 4 and in more detail in FIG. 6, for example, which control handle 18 represents the control means that may be used with, and is partially instrumental in extinguishing an aircraft engine fire. This control handle 18, otherwise known as a fire "T" handle, may likewise be constructed from a pair of half-handle portions or segments, similar to that of the control knob member 12 of the inventive form of FIGS. 1–3, which control-handle segments have been indicated particularly at 19 and 20 in the aforementioned FIG. 4, for example. These segments 19 and 20, which are shown plastically joined together, along the juncture line at 21, into the integral control handle 18 may, again, be each comprised of a polarized plastic material respectively circularly polarized in the counterclockwise direction (segment 19), for example, and in the clockwise direction (segment 20). As in the case of the landing gear-control handle-knob member 12 of FIGS. 1–3, the segments 19 and 20 of the fire "T" handle 18 may be each comprised of a relatively thin, outer layer or sheet of polarizing material, as indicated schematically at 19a and 20a, that is similar to that of the cover sheets 14a and 15a of the control knob member 12 (FIG. 3) and, as such, provide for the transmission therethrough of plane-polarized light, and a relatively thick, primary and supporting, plastic structure at 19b and 20b, respectively. Once again, each of the cover sheets 19a, 20a may be constructed from known polarizing material that exhibits a characteristic polarizing direction for the purpose of transmitting plane-polarized light, and the primary and supporting plastic structures 19b and 20b may each be constructed of a double-refracting plastic material, such as calcite which, when receiving plane-polarized light from and through the cover sheets 19a, 20a, will circularly polarize the said light respectively in counterclockwise and clockwise directions for the fire extinguisher-control handle-segments 19 and 20 to thereby substantially block any transmittal of light therethrough. Finally, each of said control handle-segments 19 and 20 may be made substantially non-reflective, as by roughening as stated hereinbefore, or, alternatively, by the use of an non-reflective-type of coating on the circumference thereof.

As is depicted more particularly in FIG. 6, the inventive fire "T" handle, depicted in united form, again, generally at 18, is seen as incorporating an elongated opening, at 22, in which opening 22, one end of a fuel-valve-operating rod member, shown in phantom at 23 in FIGS. 6 and 7, may be rigidly affixed, as by means of a pair of screw elements at 24 and 25. Since the fire "T" handle 18 is made of plasic material, as noted hereinbefore, metal inserts are provided for the said screw elements, at 26 and 27. Again, one or more internal lights, as required, and preferably red in color, may be mounted in the upper portion of the fire "T" handle 18 for the purpose of providing illumination therefor to warn the pilot, copilot or other aircrew member in the event of a fire or excessive heat occuring in one or more of the aircraft engines, for example. As seen more clearly in FIG. 5, the rod member 23 (FIGS. 6 and 7) may, in one form thereof, incorporate a bifurcated portion on its upper end, as indicated in phantom at 23a and 23b in FIG. 5 and in broken lines in FIG. 7, which bifurcated upper end portions 23a and 23b respectively engage in elongated passageways or openings, indicated at 28 and 29 in the aforementioned FIG. 5. In addition, said bifurcated, rod-upper end portions 23a and 23b may, in one modification thereof, incorporate cutout portions, as is clearly visible in FIG. 7, for example, for the purpose of providing for the engagement therewithin of a portion of the circumference of each of said screw elements 24 and 25 and thus ensure a rigid interconnection and attachment between the handle 18 and the said rod member 23. Therefore, on a fire or excessive heat occuring in one or more of the aircraft engines, as for example, engine No. 8, the internal red light or lights mounted in the handle 18 would automatically come on, and the pilot, copilot or other aircrew member would simply grasp the said control or fire "T" handle 18 for the fire extinguisher means representing the said engine No. 8, which would be marked as shown in FIG. 5a, and pull it and the rod member 23 in an outward direction. The latter action would result in the shut-off of the fuel valve supplying fuel to the said engine No. 8. Of course, once more, any excessive ambient light in the cockpit area, which would normally obscure the particular fire "T" handle 18 and its internal light or lights, would, with the use thereon of the new and improved substantially non-reflective and non-light-transmission features involve with the present invention, be substantially counteracted and thus enable the pilot, copilot or other aircrew member to clearly see the warning illumination of any and all of the aforesaid fire "T" handles in the event of an emergency.

Although the present invention has been expressly described in connection with the use of circularly polarized light oriented in opposite directions and incorporated in a pair of matching segments comprising a landing gear-control handle-knob member and the fire "T" handle for an aircraft engine-fire extinguisher system, it is to be understood that the same concept may be utilized on other airborne or ground control means for both primary and accessory equipment without departing from the true spirit or scope of the invention, as delineated in the appended claims.

I claim:

1. An aircraft cockpit-mounted control mechanism including a first, operating handle-lever member for direct attachment with, and actuation of a selected aircraft system; and a second, glare-proof, manually operable control member attached to said first, operating handle-lever member and adjustable to one or more operating positions by a pilot, copilot or other aircrew member; said second, manually operable control member being adapted for housing therewithin one or more concealed warning lights, and comprising: first, relatively thin, outer cover layer means of linear light-polarizing material for transmitting plane-polarized light therethrough from the initial impingement thereon of ambient light found in the aircraft cockpit in which mounted and normally forming a glare condition; and second, inner and relatively thick, main control member-base support means inwardly disposed of, and in integral supporting contact throughout its entire circumference with said first, relatively thin and linear light-polarizing, outer cover layer means, and being composed of a united and matching pair of oppositely disposed and oppositely oriented, circular light-polarizing, control member-portions respectively left and right-circularly polarizing, and thereby absorbing and prohibiting any further transmission of the plane-polarized light being initially transmitted thereto by said first, outer cover layer means, and thus eliminating a substantial portion of the ambient light normally causing a glare condition tending to obscure the otherwise clearly visible illumination from the concealed warning lights.

2. In an aircraft cockpit-mounted control mechanism as in claim 1, wherein said second, manually operable member comprises a control knob for operating an aircraft landing gear between raised and lowered positions; said control knob comprising; a pair of control knob-segments each incorporating a main base portion respectively constructed of left and right light-circular polarizing plastic material plastically joined together into an integral knob unit; and a relatively thin, outer plastic layer covering the joined pair of control knob-segments and containing the said linear light-polarizing material.

3. In an aircraft cockpit-mounted control mechanism as in claim 2, wherein said thin plastic layer covering on each of said control knob-segments may further incorporate a roughened and therefore substantially non-reflective surface even further eliminating the glare condition normally resulting from ambient light in the aircraft cockpit.

4. In an aircraft cockpit-mounted control mechanism as in claim 2, wherein said plastically joined control knob-segments further incorporates an electroluminescent strip around, and bonded on the outer circumference of said relatively thin, outer plastic layer covering for thereby increasing the natural visibility of the said control knob-member during conditions of dark or other relatively low visibility.

* * * * *